United States Patent [19]

Kviesitis

[11] Patent Number: 5,151,123
[45] Date of Patent: Sep. 29, 1992

[54] RESILIENT SOIL COMPOSITION FOR ATHLETIC FIELDS

[75] Inventor: Boris Kviesitis, Des Moines, Iowa
[73] Assignee: True Pitch, Inc., Altoona, Iowa
[21] Appl. No.: 521,409
[22] Filed: May 10, 1990
[51] Int. Cl.$^5$ .............................................. C09K 17/00
[52] U.S. Cl. .............................. 106/287.17; 106/900; 427/220; 427/218; 427/221; 524/357
[58] Field of Search .............. 427/220, 218, 215, 214, 427/219, 221; 106/287.17, 900; 524/357

[56] References Cited

U.S. PATENT DOCUMENTS 3,887,506 6/1975 Hewitt .................................. 404/75

FOREIGN PATENT DOCUMENTS 56-10584 2/1981 Japan .
58-11729 1/1983 Japan .

*Primary Examiner*—Michael Lusignan
*Assistant Examiner*—Roy V. King
*Attorney, Agent, or Firm*—Zarley, McKee, Thomte, Voorhees & Sease

[57] ABSTRACT

The soil composition of this invention is comprised of a mixture of sand, clay, a plasticizer material, water, and a coloring pigment, if desired. The components of the soil composition are preferably present in the following proportions by weight: sand 50-70%; clay 10-40%; plasticizer 0.5-5.0%; water 5-20%; and coloring pigment 1-5%. The method of making the invention involves continuously mixing a portion of the sand and the plasticizer in an agitation mixer. The same becomes coated with the plasticizer, whereupon a quantity of clay is then added, followed by an additional portion of the plasticizer material. It is particularly important that the sand particles become coated with the plastizing compound and clay. The coloring pigments are added and mixed thereafter. As soon as complete mixing takes place, material can be immediately transferred from the mixer to suitable packaging.

11 Claims, No Drawings

RESILIENT SOIL COMPOSITION FOR ATHLETIC FIELDS

BACKGROUND OF THE INVENTION

This invention arose from a problem that developed in conjunction with molded fiberglass baseball pitching mounds that had an indented compartment forwardly of the pitching rubber for the pitcher to step onto as the pitching motion was completed. That compartment normally was filled with a mixture of sand and clay, but that type of soil composition proved to be relatively unsatisfactory.

First of all, the combination of sand and clay did not drain or dry out very easily. In addition, that soil composition, primarily because of the presence of the clay, would become very hard and had no resiliency. In addition, that soil composition was difficult to work or dress when such was necessary, and would adhere to the shoes of the pitcher.

It is therefore a principal object of this invention to provide a soil composition for athletic fields and the like which has good water draining and drying characteristics.

A further object of this invention is to provide a soil composition that will have resiliency and which will not become hard and packed upon either drying or upon being stepped upon.

A further object of this invention is to provide a soil composition which will not adhere to the footwear of persons walking or running thereon.

A still further object of this invention is to provide a method of making a soil composition which is not time consuming and which requires no drying period.

A still further object of this invention is to provide a soil composition which can be easily worked and shaped.

A still further object of this invention is to provide a soil composition which can be changed to different colors by suitable pigments.

A still further object of this invention is to provide a soil composition that can be easily packaged and transported.

These and other objects will be apparent to those skilled in the art.

BRIEF SUMMARY OF THE INVENTION

The soil composition of this invention is comprised of a mixture of sand, clay, a plasticizer material, water, and a coloring pigment, if desired. The components of the soil composition are preferably present in the following proportions by weight: sand 50-70%; clay 10-40%; plasticizer 0.5-5.0%; water 5-20%; and coloring pigment 1-5%.

The method of making the invention involves continuously mixing a portion of the sand and the plasticizer in an agitation mixer. The sand becomes coated with the plasticizer, whereupon a quantity of clay is then added, followed by an additional portion of the plasticizer material. It is particularly important that the sand particles become coated with the plasticizing compound and clay. The coloring pigments are added and mixed thereafter. As soon as complete mixing takes place, the material can be immediately transferred from the mixer to suitable packaging.

DESCRIPTION OF THE PREFERRED EMBODIMENT

The following tables show the preferred ingredients by weight of the soil composition of this invention.

TABLE I

| Ingredient | Range | Preferred |
| --- | --- | --- |
| Sand (Silicon Dioxide) | 50-70% | 60% |
| Polymer (Polyvinyl Alcohol) | 0.5-5.0% | 1% |
| Water (H$_2$O) | 5-20% | 11% |
| Clay (Hydrated Aluminum Silicate) | 10-40% | 26% |
| Coloring Pigment | 1-5% | 2% |

TABLE II

| Ingredient | Range | Preferred |
| --- | --- | --- |
| Sand (Silicon Dioxide) | 50-70% | 60% |
| Polymer (Polyvinyl Alcohol) | 0.6-5.0% | 1% |
| Glycerol (Plasticizer) | 0.2-3.0% | 0.5% |
| Water (H$_2$O) | 5-20% | 11% |
| Clay (Hydrated Aluminum Silicate) | 10-40% | 25.5% |
| Coloring Pigment | 1-5% | 2% |

Polyvinyl alcohol could be added or substituted with other polymers which possess plastizing properties. Other suitable polymers would be polyvinyl acetate, polyvinyl chloride, silicon, or natural or synthetic rubber latex, or glycerol.

The preferred method of making the soil composition of this invention involves mixing the polyvinyl alcohol with water in the proportions indicated to create a plasticizer in the form of a viscous-like substance. A quantity of sand is introduced into an agitation mixture, and a portion of the plasticizer is introduced into the mixer to coat the sand. A portion of clay is then introduced into the mixer, whereupon plasticizer, sand and clay are introduced in turn in accordance with the above proportions to complete the composition. Care should be exercised to introduce the plasticizer following the introduction of additional sand so that the sand particles can be coated with both the plasticizer and the clay. A suitable pigment, such as iron oxide, can be added towards the end of the mixing cycle.

The time for the mixing cycle is obviously variable depending upon the quantity of composition being mixed. It is also preferable that the mixing take place at high speed to disperse the materials throughout the mixture. The plasticizer can be sprayed into the mixer to facilitate the even distribution thereof over the particles of sand.

As soon as the composition is suitably mixed, it can be immediately transferred to plastic bags or the like without any drying operation.

The resulting composition is pliable and can be easily worked to a given shape. It will not become hardened, it dries easily, and it will not adhere to the spikes or shoes of the players.

The soil composition of this invention is a substantial improvement over the prior use of clay, sand, or a mixture thereof. It has many useful applications on various types of athletic fields, walk ways, and innumerable other environments.

It is therefore seen that this invention will achieve at least all of its stated objectives.

I claim:

1. A resilient soil composition for athletic fields which will not become hard and packed upon either drying or being stepped upon and which can be easily worked and shaped, resulting from the method of:

taking a quantity of sand comprised of a plurality of sand particles;

coating said sand particles with a liquid plasticizer material comprised of a mixture of water and at least one from the group of polyvinyl alcohol, polyvinyl acetate, silicon rubber latex or glycerol, and adding a quantity of clay comprised of a plurality of clay particles, along with a quantity of said plasticizer material to said coated sand particles.

2. The composition of claim 1 wherein said plasticizer material is a mixture of polyvinyl alcohol and water.

3. The composition of claim 2 wherein said sand comprises 50-70% by weight of said composition; said clay comprises 10-40% by weight of said composition; said polyvinyl alcohol comprises 0.5-5% by weight of said composition; and said water comprises 5-20% by weight of said composition.

4. The composition of claim 2 wherein a quantity of glycerol comprises a part of said composition.

5. The composition of claim 1 or 2 wherein a coloring pigment comprises a part of said composition.

6. The composition of claim 1 or 2 wherein said sand comprises approximately 60% by weight of said composition; said clay comprises approximately 26% by weight of said composition; said polyvinyl alcohol comprises approximately 1% by weight of said composition; and said water comprises approximately 11% by weight of said composition.

7. The composition of claim 1 wherein said plasticizer material constitutes between 0.5 to 5% by weight of said composition.

8. The composition of claim 8 wherein said composition consists essentially of 50-70% by weight of said sand; 10-40% by weight of said clay; 0.5-5% by weight of said plasticizer material; and 5-20% by weight of water.

9. The composition of claim 1 wherein said composition consists of 50-70% by weight of sand; 10-40% by weight of said clay; 0.5-5% by weight of said plasticizer material; and 5-20% by weight of water.

10. The composition of claim 1 wherein said composition consists essentially of 50-60% by weight of sand; 10-126% by weight of said clay; 0.5-1% by weight of said plasticizer material; and 5-11% by weight of water.

11. The composition of claim 1 wherein said composition consists of 50-60% by weight of said sand; 10-26% by weight of sand clay 0.5-1% by weight of said plasticizer material; and 5-11% by weight of water.

* * * * *

UNITED STATES PATENT AND TRADEMARK OFFICE
CERTIFICATE OF CORRECTION

PATENT NO. : 5,151,123
DATED : September 29, 1992
INVENTOR(S) : Boris (NMI) Kviesitis It is certified that error appears in the above-indentified patent and that said Letters Patent is hereby corrected as shown below:

Column 4, line 20, change "10-126%" to - 10-26% -.

Signed and Sealed this

Nineteenth Day of September, 1995

Attest:

BRUCE LEHMAN

Attesting Officer     Commissioner of Patents and Trademarks